Figure 1:
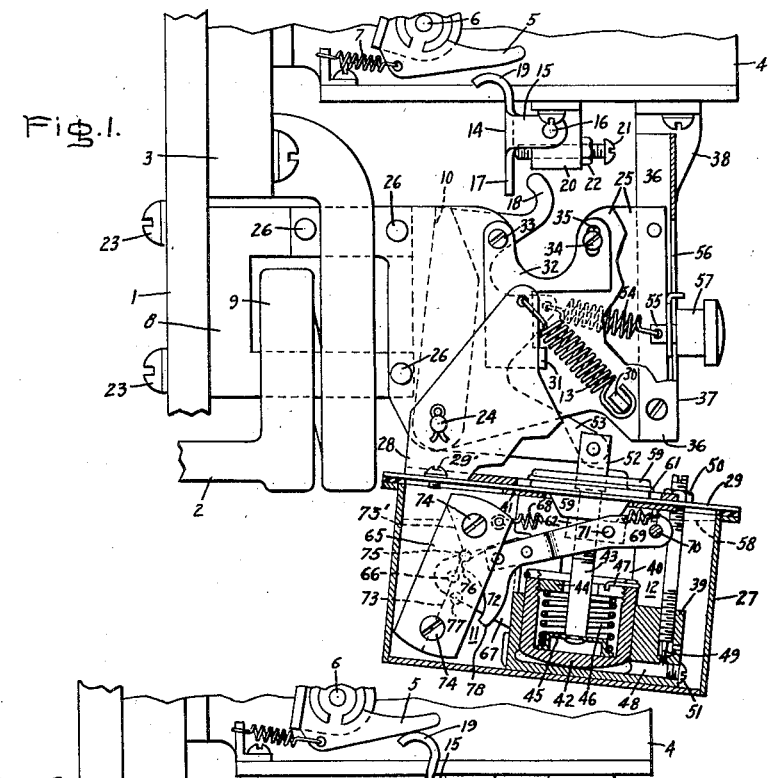

May 27, 1952  G. H. SYROVY ET AL  2,598,463
TIME ELEMENT ELECTROMAGNETIC DEVICE
Filed June 4, 1945  4 Sheets-Sheet 1

Inventors:
Gerald H. Syrovy,
Joseph W. Seaman,
by Harry E. Dunham
Their Attorney.

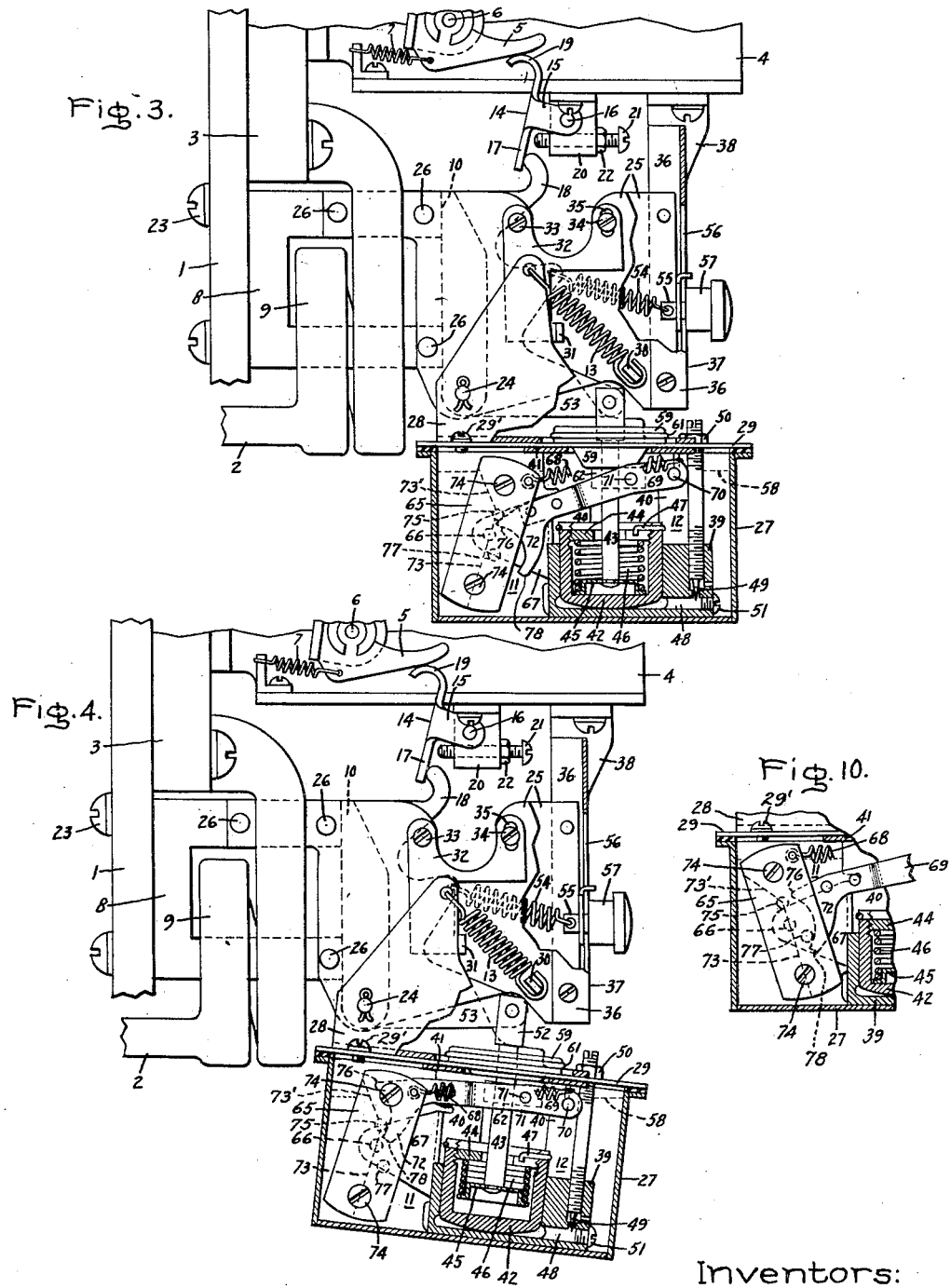

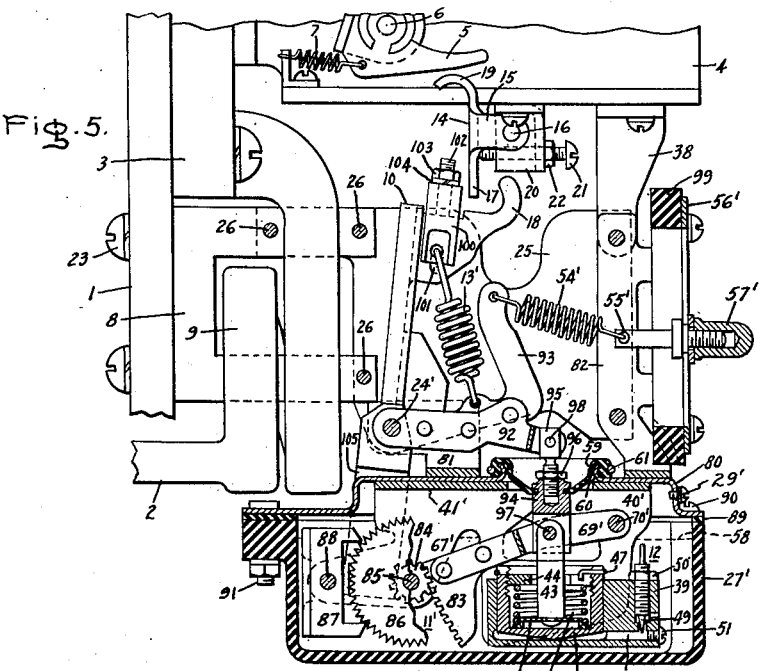

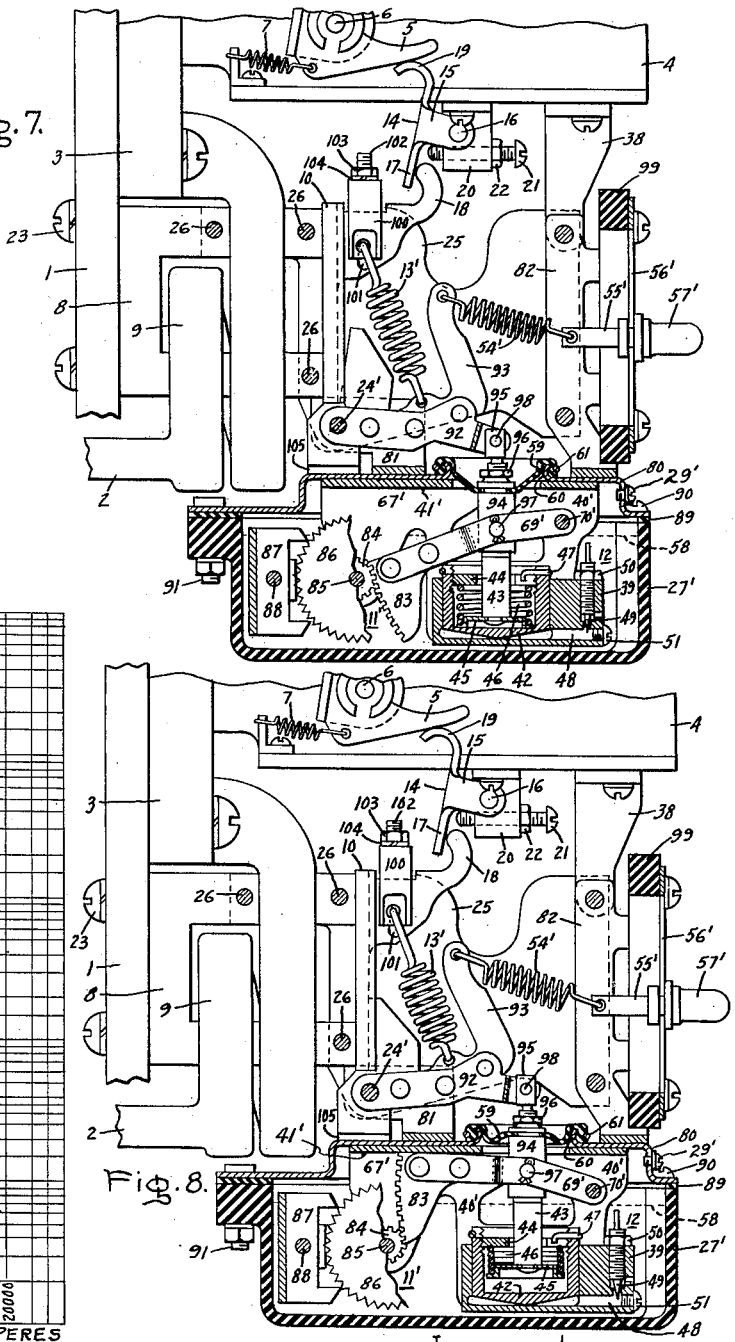

Patented May 27, 1952

2,598,463

UNITED STATES PATENT OFFICE 2,598,463

TIME ELEMENT ELECTROMAGNETIC DEVICE

Gerald H. Syrovy, Swampscott, Mass., and Joseph W. Seaman, Kennett Square, Pa., assignors to General Electric Company, a corporation of New York Application June 4, 1945, Serial No. 597,464

9 Claims. (Cl. 200—108)

Our invention relates to improvements in time element electromagnetic devices and more particularly to improvements in time element electromagnetic tripping devices for circuit breakers.

In the control of circuit breakers under abnormal circuit conditions either by relays or by direct trip devices, a selective or discriminating action based on current and time is usually desirable in order to avoid unnecessary tripping. Thus, for example, in motor starting a relatively long time delay in tripping is necessary to carry the motor through the relatively high current starting period. Such relatively long time delay is, in general, safe only for a comparatively small range in overload current values. On the other hand, when synchronizing over a relatively large range in phase difference, much larger abnormal currents may occur. The time delay in tripping should accordingly be relatively short for a comparatively large range in abnormal currents. For faults in the nature of short circuits, substantially instantaneous tripping is desirable.

Also, in order to provide fault protection with maximum continuity of service where a plurality of circuit breakers are arranged in series in a circuit extending from a generator through a bus section to a feeder and thence to some load such as a motor, the overcurrent tripping devices on the various circuit breakers must be coordinated so as to effect the opening of only the circuit breaker nearest the fault. Thus, for a fault on the load side of the motor circuit breaker, only this circuit breaker should open, and for a fault on the feeder, only the feeder circuit breaker should open. Similarly, for a fault between the feeder circuit breaker and the bus tie circuit breaker, only the latter should open, and for a fault between the bus tie circuit breaker and the generator circuit breaker, only the generator circuit breaker should open.

In order to accomplish such selective tripping of the different circuit breakers by means of overcurrent tripping devices, the minimum operating currents for these devices must be so adjusted that each of the circuit breakers on the line requires less current than the immediately preceding circuit breaker, that is, the next circuit breaker on the generator side. Also, for any value of current above the minimum operating value, each circuit breaker must open in less time than the immediately preceding circuit breaker, that is, the next circuit breaker on the generator side. Furthermore, in order to minimize the resultant damage to equipment, the operating time of the overcurrent trip devices should be kept to a minimum. Obviously, in order to have satisfactory discriminating operation, the current-time characteristics of the tripping devices of the different circuit breakers must not intersect. Also, the time delay characteristic for the circuit breaker nearest the motor load must be such as to give relatively long times in order to avoid tripping on the transient inrush current required to start the motor and yet permit substantially instantaneous tripping for fault currents exceeding the transient starting current. In case of a relatively long conductor between the motor circuit breaker and the motor, a fault in or near the motor may not produce a short circuit current of sufficient magnitude to trip the motor circuit breaker instantaneously. In this case, the long time delay of the trip device associated with the motor circuit breaker will insure the clearance of such faults. To operate selectively with the circuit breaker nearest the motor, the generator, bus tie and feeder circuit breakers must have time delay tripping. For currents above the instantaneous trip setting of the circuit breaker nearest the motor, the time delay of the preceding circuit breakers can be relatively short and need be long enough only to permit operation of the preceding circuit breakers, that is, the circuit breakers nearer the generator. In the case of a relatively long feeder, it is possible that a fault on the far end might not produce a short circuit current of sufficient magnitude to operate the trip device on the feeder circuit breaker. For this reason, it is desirable to equip the feeder circuit breaker with a time delay device which will also operate on lower values of current after a relatively long time delay. Accordingly, the feeder circuit breaker should have both long time delay and short time delay tripping as well as instantaneous tripping at high values of current when required to back up smaller circuit breakers in a cascade system. In other words, in order to obtain the desired selectivity in a set of series connected circuit breakers, at least some of the circuit breakers in such a system must have a three-stage time-current characteristic embodying relatively long time, relatively short time and instantaneous features.

Some time element electroresponsive devices have embodied both the instantaneous trip feature and the short time delay range overcurrent trip feature. As far as we know, however, such devices have too high a minimum pick-up for relatively small overloads such as occur in motor starting. Even if such devices were set for a lower pick-up, there would not be sufficient time delay, for example, to carry through the motor starting period. Other time delay electroresponsive devices have embodied the instantaneous trip feature and the long time delay overload trip feature. Such devices are not suitable for coordinated circuit breaker installations because of undesirable time-current characteristics. Devices embodying an instantaneous response and a time delay overcurrent response have been termed dual overload trips.

An object of our invention is to provide an improved selective long and short time element electromagnetic device having separately adjustable calibrating means for providing a relatively long time of response over a predetermined range of variation of an electric quantity, a relatively short time of response over a contiguous higher predetermined range of variation of the electric quantity embracing higher values thereof, and if desired a substantially instantaneous time of response for still higher values of the quantity. Another object of our invention is to provide an improved time element electromagnetic device which has contiguous relatively long and short time element response characteristic throughout separately adjustable operating ranges. Still another object of our invention is to provide an improved three-stage time element response electromagnetic device which is compact and readily adaptable to existing circuit breakers. A further object of our invention is to provide an improved time element electromagnetic device in which the desired three-stage time element response characteristic is obtained with the use of only one armature. These and other objects of our invention will hereinafter appear in more detail.

In accordance with our invention, we provide an improved selective long and short time element electromagnetic circuit breaker tripping device comprising means capable of separate calibration for effecting a relatively short time delay in the movement of the tripping member of the device to the tripping position when the winding of the device is energized by currents within a predetermined range of values and a relatively long time delay when the winding is energized by currents below the lower limit of such predetermined range and for permitting a substantially instantaneous movement of the member to its tripping position when the winding is energized by currents above the upper limit of such predetermined range of values.

Our invention will be better understood from the following description when considered in connection with the accompanying four sheets of drawings, and its scope will be pointed out in the appended claims.

Figure 2:
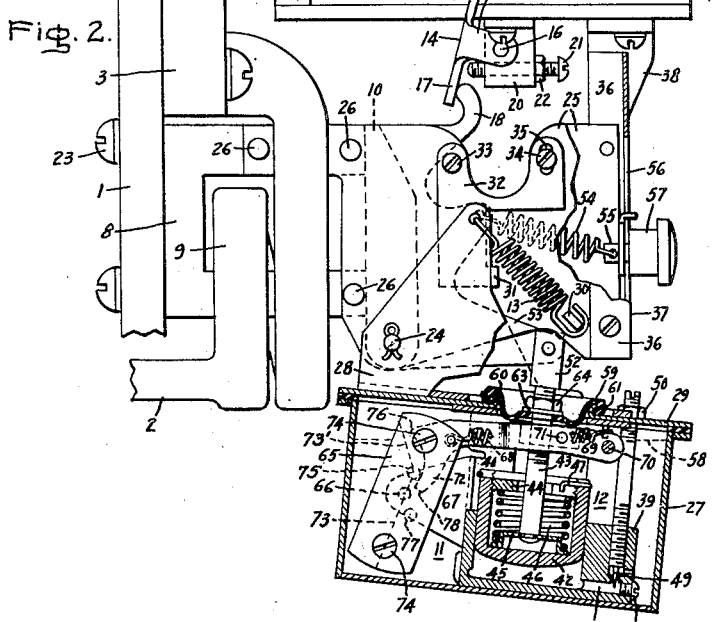

In the accompanying four sheets of drawings, Fig. 1 is a side elevation, partly in section, of a time element electromagnetic device embodying our invention as applied to the tripping of circuit breakers with the armature shown in the unattracted position; Fig. 2 is a view similar to Fig. 1 showing the parts as positioned at the end of the relatively long time delay operation; Fig. 3 is a view similar to Fig. 1 showing the parts as positioned at the end of a substantially instantaneous time operation; Fig. 4 is a view similar to Fig. 1 showing the parts as positioned at the end of a relatively short time delay operation; Figs. 5, 6, 7 and 8 are views, similar respectively to Figs. 1, 2, 3 and 4, of a modification of our invention, this modification embodying additional improvements which are disclosed and claimed in the copending application of John A. Oppel, Serial No. 597,465, filed concurrently herewith, now Patent No. 2,495,127, January 17, 1950 and assigned to the assignee of this invention; Fig. 9 is a time-current characteristic typical of the modification of our invention shown in Figs. 5 to 8, inclusive; and Fig. 10 is a partial view similar to Fig. 1 illustrating an intermediate position of certain of the parts during operation from the position shown in Fig. 1 to the position shown in Figs. 2 and 4.

For the purpose of illustrating our invention, we have shown embodiments thereof in a time element electromagnetic device as applied to the tripping of a circuit breaker in response to predetermined conditions of abnormal current flow through the circuit breaker. As far as our invention is concerned, the particular type of circuit breaker is immaterial, but we have shown parts of an automatic trip-free air circuit breaker such as that disclosed, for example, in United States Letters Patent 2,227,160, issued December 31, 1940. Only such parts as are essential to an understanding of our invention are shown. These parts are the mounting base or panel 1 of suitable insulating material, lower stud 2, lower stationary contact block 3, mechanism frame 4, trip latch 5 pivotally supported on the frame at 6, and spring 7 for biasing the trip latch to the latching position, shown in Fig. 1.

The embodiment of our invention, shown in Figs. 1 to 4, inclusive, comprises a magnetic core 8, an energizing winding 9 therefor, and an armature 10. In accordance with our invention, we provide suitable separately adjustable means for calibrating the tripping response of the armature to relatively high and low overcurrents together with a relatively short time delay mechanism in the form of an escapement inertia means 11 for effecting a relatively short time delay in the movement of the armature 10 to the attracted position when the winding 9 is energized by currents within a predetermined high range of values, in conjunction with a relatively long time delay mechanism embodying means such as a dashpot 12 for effecting a relatively long time delay in the movement of the armature 10 to the attracted position when the winding 9 is energized by currents in the lower range of values as well as means including a spring 13 for permitting a substantially instantaneous movement of the armature 10 to the attracted position when the winding 9 is energized by current above the upper limit of said range of values. However, in case such instantaneous movement of the armature is not desired, the spring means may be omitted so that only the selective long and short time delay action is obtained. As shown, the winding 9 is arranged around one leg of the core 8 and is connected in series between the lower stud 2 and the lower stationary contact block 3.

For effecting the release or tripping movement of the trip latch 5 upon movement of the armature 10 to the attracted position, we provide an intermediate latch releasing member such as a lever 14 having a transverse arm 15 pivotally supported at 16 so that the lower portion 17 of the lever extends into the path of movement of a tripping lug 18 secured to the armature for movement therewith. As shown, the upper portion of the lever 14 is curved to form a shoe 19 which, upon clockwise rotation of the lever as the armature 10 moves to the attracted position, engages the tail of the latch 5 to rotate it counterclockwise to the releasing position shown in Figs. 2, 3 and 4. The pivot 16 is supported on the frame 4 by suitable means such as a bracket 20. This bracket is provided with means such as a screw 21 and a lock nut 22 for adjusting the clearance between the shoe and the latch for the normal latched closed position of the circuit breaker. The core 8 is secured to the panel 1 by suitable means such as screws 23.

As shown, the armature 10 is pivotally mounted at 24 between side plates 25 which are suitably secured to the core 8 at 26. In accordance with our invention, the inertia oscillating escapement short time delay mechanism 11 and the dashpot long time delay mechanism 12 are housed in a suitable reservoir or container 27 which is secured to a U-shaped member 28. This member is pivotally supported at 24 and is suitably secured to a supporting plate 29 which also is the cover of the reservoir. The springs 13, of which there may be two, are secured between the sides of the U-shaped member 28 and projections such as lugs 30 on the side plates 25. These springs 13 and the weight of the parts carried by the U-shaped member 28 bias the member for clockwise rotation against a stop 31 which may be integral with one of the side plates 25. However, for purposes of adjustment, we have shown the stop 31 as a lug on a plate 32 which is adjustably positioned on one of the side plates 25 by suitable means comprising screws 33 and 34. Thus, for example, the screw 34 passes through a slot 35 in the plate 32 which can thus be turned about the screw 33 to vary the position of the stop 31 relatively to its associated side plate 25. Suitable lock washers and nuts will, of course, be provided to prevent undesired movement of the plate 32 relatively to its associated plate 25 once the screws 33 and 34 are tightened. For rigidity and alignment, the side plates 25 are suitably secured to the flanges 36 of a channel member 37 which is supported by angle brackets 38 suitably secured to the circuit breaker frame 4 and to the flanges of the channel member 37.

As shown, the long time delay dashpot mechanism 12 comprises a cylinder block 39 which is supported between the legs 40 of a U-shaped member 41 suitably secured to the supporting plate 29. Within the cylinder block 39, there is mounted a piston 42 which is provided with a piston rod 43. For the desired intermediate time delay range, the piston rod 43 is, in accordance with our invention, arranged for movement relatively to the piston 42, but for currents below this value the piston rod moves as a unit with the piston. Because of these two different responses, we designate such a dashpot as a selective action dashpot. For this purpose, the piston 42 is made hollow and is provided with an adjustably mounted head 44 between which and a rigid diaphragm 45 secured to the lower end of the piston rod 43, there is positioned suitable yielding means such as a compression spring 46. The stress on this spring 46 can be varied so as to correspondingly vary the calibration of the upper limit of the long time delay overcurrent operating range which is identical with the lower limit of the contiguous short time delay overcurrent operating range by turning the head 44 relatively to the piston 42. For holding the head 44 in any predetermined position relatively to the piston, there is provided a snap lock ring 47 which seats in a circumferential recess on the outside of the piston and engages registering openings in the top of the piston and the head.

The cylinder block 39 is provided with a channel 48 for entrance of suitable fluid under the piston 42 by way of an adjustable entry comprising a valve 49 which is held in any desired position by a lock nut 50. For testing purposes apart from the action of the dashpot itself, there is provided a relatively large opening for entrance of fluid to the cylinder. Normally this opening is sealed by suitable means such as a screw 51. With this screw removed, the retarding action of the dashpot is practically negligible and testing and adjustment of the spring 54 can readily be made. The piston rod 43 is pivotally coupled through a yoke member 52 to a plate 53 which is rigidly secured to the armature 10 for movement therewith. For adjusting the lower limit of the long time delay overcurrent operating range, we provide a separately adjustable spring 54 which is connected between the plate 53 and a pin 55. The pin 55 projects through a vertical slot 56 in the U-shaped member 37, the face of which constitutes a scale plate, and the pin can be clamped in different positions thereon by a cap nut 57.

In order to avoid, insofar as practically possible, variation in dashpot timing with change in temperature, we preferably use a suitable lubricating fluid whose viscosity variation with change in temperature is a minimum. One such fluid is known as silicone oil. This oil is the subject matter of a copending application, Serial No. 463,814, filed October 29, 1942, now Patent No. 2,469,888, by Winton I. Patnode. This oil has a relatively low viscosity index and is not only suitable for the desired dashpot action but also lubricates the inertia means 11 and to some extent increases the duration of its timing. The level of the oil in the reservoir or container 27 is indicated by the broken line 58. In order that time element electroresponsive devices embodying our invention may be shipped with oil in the container 27 and yet be vented so as to operate freely when mounted in place, there is provided suitable means such as a sealing screw 29' which may be removed for venting purposes after the device is mounted in position on the switchboard or other support.

In order to avoid the friction load of bushing devices and the like and yet prevent oil leakage from the container 27, the piston rod 43 passes through an elastic diaphragm 59 which is held against an upstanding curved flange 60 on the supporting plate 29 by a retainer clamping ring 61. The diaphragm 59 may be made from a rubber-like material which is not subject to deterioration by oil. Examples of such materials in the so-called artificial rubbers are well known to the art. As shown in Figs. 1 to 4, inclusive, the diaphragm is clamped between a yoke member 62 on the piston rod 43 and a washer 63 below a clamping nut 64, as shown most clearly in Fig. 2.

The inertia oscillating escapement short time delay mechanism 11 comprises a generally rectangularly shaped mass or weight 65 which is centrally pivotally supported for oscillation about the pin 66 on extensions or arms 67 of the legs 40 of the U-shaped bracket 41. The weight 65 is biased for clockwise rotation about its pivot 66 by suitable means such as a spring 68 which has a relatively low gradient and which is connected between the upper right-hand corner of the weight and the base of the bracket 41. For oscillating the weight 65 in response to movement of the piston rod 43, we provide an operating arm 69 which is pivotally supported at 70 between the legs 40 of the bracket 41 and which is pivotally connected at 71 to the yoke 62 on the piston rod 43. The left-hand or forked end 72 of the operating arm 69 is positioned for movement in a longitudinal slot in the weight 65. The depth of this slot is from the right-hand edge of the weight to substantially its longitudinal center line 73 except at the upper end where the slot goes back to the broken line 73'.

In the rest position of the inertia means 11, shown in Fig. 1, a pin 75, bridging the slot in the weight 65, bears against the upper point 76 of the forked end 72 of the operating arm 69 thus limiting the clockwise movement of the weight. For the purpose of imparting an oscillatory escapement movement to the weight 65 as the arm 69 is moved clockwise, another pin 77, bridging the slot in the weight, is arranged to cooperate with the lower point 78 of the forked end 72 of the arm. Since movement of the armature 10 to the attracted position turns the operating arm 69 clockwise, the upper and lower points 76 and 78 of the forked end 72 of the arm respectively engage the pins 75 and 77. At the beginning of the movement, as will be apparent from Fig. 1, the upper point 76 of the forked end 72 engages the pin 75, thereby turning the weight 65 counterclockwise. As the upper point 76 of the forked end passes the pin 75, the weight 65 has been turned counterclockwise so that the pin 77 engages the lower point 78 of the forked end. The parts are then positioned as shown in Fig. 10. Then on further clockwise movement of the operating arm 69, the engagement of the pin 77 by the lower point 78 opposes the counterclockwise movement of the weight 65 and actually reverses its movement to clockwise as the arm 69 continues to the end of its clockwise movement. The parts are then positioned as shown in Figs. 2 and 4.

For adjustment purposes to vary the short time delay, the weight 65 may consist of the center slotted piece and one or more side pieces which are secured thereto outside of the arms 67 by suitable means such as screws 74.

In accordance with our invention, the separately adjustable response calibrating spring 46 is so proportioned and the adjusting head 44 so positioned that, for currents within the variable intermediate short time delay operating range between a predetermined low value and a predetermined high value, the piston rod 43 moves upwardly relatively to the piston 44 under the relatively short time delay of the inertia means 11 since the piston 42 is practically held immovable by the relatively slow action of the dashpot. For currents less than the low value, the spring 46 does not yield, and the piston 42 and the piston rod 43 move upward as a unit under the bias of the separately adjustable spring 54 that calibrates the lower overcurrent limit of the relatively long dashpot time delay operating range of the armature to the attracted position. For currents exceeding the predetermined high value constituting the upper limit of the variable short time delay overcurrent operating range, the armature 10 is calibrated to be moved to the attracted position substantially instantaneously against the bias of the springs 13 and the weight of the parts carried by the U-shaped member 28.

Assuming the parts positioned as shown in Fig. 1 and also that overload current appears in coil 9 below the predetermined low value that constitutes the dividing limit between the contiguous short time operating range and the long time operating range, then the force exerted on the armature 10 to move it to the attracted position will not be sufficient to overcome the bias either of the spring 46 or of the springs 13 and the weight of the parts carried by the bracket 28. The armature 10 will, however, be attracted with a force sufficient to cause the variable long time delay operating range lower limit calibrating spring 54 to yield slowly because of the action of the dashpot 12. As the oil flows through the channel 48 restricted by the needle valve 49, the piston 42 and the parts associated therewith rise to the position shown in Fig. 2 until the armature reaches the attracted position. During this movement of the armature, the lug 18 engages the lower portion 17 of the tripping lever 14, thereby turning this lever clockwise to effect the counterclockwise or releasing movement of the latch 5. The parts are now positioned as shown in Fig. 2. As soon as the circuit through the circuit breaker is open, the trip coil 9 is, of course, deenergized, whereupon the armature 10 and associated parts return to the position shown in Fig. 1.

Assuming now that the circuit breaker is closed and an overload current appears in the coil 9 of such a magnitude as to stretch the springs 13 and raise the bracket 28 and the parts carried thereby, then, because of the strong magnetic action, the armature 10 will move to the attracted position substantially instantaneously since there is no time delay action due to the dashpot 12 and the inertia means 11. The parts will then be positioned as shown in Fig. 3.

If, however, the current in the coil 9 is within the short time delay operating range between the predetermined high and low values, then the force on the armatures 10 is sufficient to compress the dashpot spring 46 and also stretch the spring 54 without appreciable movement of the piston 42 because of the dashpot drag thereon, and the parts are positioned as shown in Fig. 4. In this case, the time delay retardation of the armature 10 is dependent upon the oscillating escapement timing action of the inertia means 11, such retarding action being relatively short, however, in comparison with the time delay action of the dashpot 12.

The modification of our invention shown in Figs. 5 to 8, inclusive, differs from the modification shown in Figs. 1 to 4, inclusive, in that the inertia means 11' is shock-proof and the mounting for the dashpot 12 and the inertia means is rigid, this latter feature involving other changes which will hereinafter appear. With this rigid mounting, undesirable shock initiated operation, possible with a movable housing, is eliminated.

For supporting the armature 10, escapement 11', dashpot 12 and associated parts in the arrangement shown in Figs. 5 to 8, inclusive, there is provided a dished plate 80 to which is suitably secured near the left end a short U-shaped bracket 81 and near the right end a long U-shaped bracket 82. The long bracket 82 is suitably secured between the side plates 25 and by the brackets 38 to the circuit breaker frame 4. A pivotal support for the armature 10, such as a pin 24', also passes through the side plates 25 and the legs of the short bracket 81 to support the left end of the dished plate 80.

For supporting the short time inertia means 11' and the long time dashpot 12 from the dished plate 80, there is provided a U-shaped bracket 41' which is suitably secured to the underside of the plate 80. This bracket has depending leg portions 40' and 67' to which the dashpot 12 and the inertia means 11' are suitably attached. As shown, the inertia means 11' is of the shock-proof double-pawl escapement type comprising an operating arm 69' which is pivotally supported at 70' between the legs 40' of the bracket 41'. On the free end of the operating arm 69', there is a segmental gear 83 which meshes with a pinion 84 pivotally supported at 85 between the bracket legs 67'.

Rigidly associated with the pinion 84 for rotation therewith is a ratchet wheel 86 on which rides a double pawl 87 also pivotally supported at 88 between the bracket legs 67'. Since the time action of the escapement 11' is dependent on the oscillating weight of the pawl 87, the time response of the escapement can be varied by adding to or removing weight from the pawl or by substituting pawls of different weights.

For housing the escapement 11' and the dashpot 12 and providing a reservoir for the desired dashpot fluid, a container 27' and an intervening gasket 89 are secured to the dished plate 80 by suitable means such as screws 90 and bolts 91. The level of the fluid in the container 27' is indicated by the broken line 58.

For controlling the movement of the armature 10 to the attracted position with varying degrees of time delay dependent upon different ranges of overcurrent in the coil 9, there is provided a movable member such as a lever 92 which is pivotally supported on the pin 24' and which has an upwardly extending arm 93. The lever 92 is connected to the escapement 11' and the dashpot 12 by a reciprocable element comprising the piston rod 43 and a yoke 94 which has an adjustably positioned head 95 provided with a lock nut 96. The yoke 94 is pivotally secured at 97 to both the escapement operating arm 69' and the piston rod 43, and the head 95 is pivotally secured at 98 to the operating lever 92. With the escapement 11' thus connected to the dashpot 12, it will be obvious that the dashpot is also rendered shock-proof since any shock tending to rotate the weighted pawl 87 in either direction will hold the escapement and parts attached thereto against movement. Also, with the housing for the escapement 11' and the dashpot 12 rigidly mounted, undesirable shock initiated operation of the device, possible with a movable housing, is eliminated.

In the arrangement shown, the flexible diaphragm 59 is secured to a suitable circumferential recess in the yoke 94. Also, the hole in the diaphragm 59 through which the yoke 94 is inserted is made materially smaller than the recessed diameter of the yoke in order to provide a bulge or fullness sufficient to permit the desired movement of the reciprocable element 94—95.

For obtaining time delayed movement of the armature 10 to the attracted position when the winding 9 is energized by current below a predetermined high value, a spring 13' is connected between the armature 10 and the lever 92. For current below such high value, this spring 13' is essentially such a rigid member that the movement of the armature 10 is delayed by the escapement 11' for currents between said predetermined high value and a predetermined low value, and for currents less than the low value, the armature is delayed by both the dashpot 12 and the escapement 11'. Inasmuch, however, as the delay due to the escapement 11' is quite small in comparison with the delay due to the dashpot 12, the time of movement of the armature to the attracted position for currents less than the low value is not materially affected by the escapement 11'.

The spring 46 is so positioned and the head 44 is so adjusted that, for currents within the range between the low and high values, the piston rod 43 moves upward relatively to the piston 42 under the relatively short delay due to the escapement 11' since the piston 42 is held practically immovable by the relatively slow action of the dashpot 12. For currents less than the low value, the spring 46 does not yield, and the piston 42 and the piston rod 43 move upward as a unit to provide the relatively long dashpot time delay in the movement of the armature to the attracted position. The lower limit of the current pick-up for the long time delay response of the armature 10 is determined by suitable yielding means such as a spring 54' which is connected between the arm 93 of the lever 92 and a pin 55.' As shown, this pin projects through a vertical slot in a scale plate 56' and can be clamped in different positions thereon by a cap nut 57' to vary the tension in the spring 54' and thereby the low current pick-up of the armature 10. The scale plate 56' may conveniently be mounted on an insulating support 99 which is secured to the long U-shaped bracket 82. Although both springs 46 and 54' have to be overcome in the escapement delay response of the armature 10, the additional amount of force required to stretch the spring 54' is relatively small in comparison with the force required to compress the spring 46.

For adjusting the instantaneous pick-up or response of the armature 10, a yoke 100 is movably positioned on the lug 18 with its arms over a slot 101 in the lug. The upper end of the spring 13 passes through the slot 101 and holes in the yoke arms. At the upper end, the yoke is provided with an adjusting screw 102 which is threaded into the yoke 100 and bears against a recess in the upper edge of the lug 18. In order to prevent undesired movement of the adjusting screw 102, a lock nut 103 and washer 104 may be provided.

In order to prevent false movements of the armature 10 about its axis of rotation 24' to the attracted position in consequence of shocks, the armature may be dynamically balanced in its plane of rotation by counterweights 105 such that the pivot 24' extends through the center of gravity of the mass of the armature and the weights.

Fig. 9 illustrates a typical time-current characteristic obtainable with a time element electromagnetic device such as that illustrated in Figs. 5 to 8, inclusive, and as it may be adjusted for a circuit breaker rated 600 amperes carrying capacity. In this Fig. 9, the coordinates along each axis are plotted on a logarithmic basis. It will be observed that for currents from about 1200 amperes to about 2400 amperes, that is, two to four times normal, the time delay varies from about 1000 seconds down to 5 seconds, i. e. point b; but from about 2400 amperes to 10,000 amperes, that is, four to seventeen times normal, the time delay varies from about 0.8 second, i. e.

point $a$, down to about 0.1 second; and for all currents in excess of 10,000 amperes, the time delay is about 0.06 second, that is, practically instantaneous.

Assuming the parts position as shown in Fig. 5 and also that overload current appears in the coil 9 below, for example, the 1200 ampere value, then neither the spring 13' nor the spring 46 will have exerted thereon, by the attraction on the armature, a force sufficient to cause either of them to yield. The armature 10 will, however, be attracted with a force sufficient to cause the spring 54' to yield slowly because of the action of the dashpot 12. As the oil flows through the channel 48 restricted by the valve 49, the piston 42 and the parts associated therewith rise to the position shown in Fig. 6 until the armature 10 reaches the attracted position. During this movement of the armature, the lug 18 engages the lower portion 17 of the lever 14, thereby turning this lever clockwise to effect the counterclockwise or releasing movement of the latch 5. The parts are now positioned as shown in Fig. 6. As soon as the circuit through the circuit breaker is open, the trip coil 9 is, of course, deenergized whereupon the armature 10 and associated parts return to the position shown in Fig. 5.

Assuming now that the circuit breaker is closed and an overload current appears in the coil 9 of such a magnitude, for example above 10,000 amperes, as to stretch the spring 13', then the armature 10 will move to the attracted position substantially instantaneously because of the drag due to the dashpot 12 and the escapement 11'. The parts will then be positioned as shown in Fig. 7.

If, however, the current in the coil 9 is within the range between a predetermined low value, for example 2400 amperes, and a predetermined high value, for example 10,000 amperes, then the force on the armature 10 is sufficient to compress the dashpot spring 46 and also stretch the spring 54' without appreciable movement of the piston 42 because of the dashpot drag thereon. The parts will then be positioned as shown in Fig. 8. In this case, the delay of the armature 10 is dependent on the timing action of the escapement mechanism 11', such timing action being relatively small in comparison with the time delay of the dashpot 12.

If an abnormal circuit condition is cleared before the expiration of the time for which a particular electro-responsive device is set, then that device should reset promptly in order to avoid any undesirable operation. Such operation may occur because of overshooting which is due to the inertia of the moving parts. In devices embodying the modification of our invention shown in Figs. 5–8, any tendency to overshoot on the long time delay operation is minimized since the motion of the piston 42 is very slow. Also, since the escapement 11' inherently tends quickly to stop the moving parts as soon as the actuating force of the flux produced by the coil 9 ceases, any tendency to overshoot during the short time delay responses is minimized. In addition to these features, the moving parts are relatively light in weight and therefore have little inertia.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. In combination, a circuit breaker movable tripping member having overcurrent responsive operating means including a movable armature, a short time delay mechanism having an operating connection with the armature for retarding the tripping movement thereof in a relatively high overcurrent tripping range, means including an adjustable spring having one end connected with the short time delay mechanism for varying the lower limit of said relatively high overcurrent range upon adjustment of the spring, a long time delay mechanism having a connection with the other end of the spring to effect yielding thereof during the operation of the short time delay mechanism and to effect operation of the long time delay mechanism to retard the tripping movement of the armature means in a relatively low overcurrent tripping range, and means including an independently adjustable spring having a connection with the armature for independently varying the lower limit of said relatively low overcurrent tripping range upon independent adjustment of the spring.

2. In combination, a circuit breaker movable tripping member having overcurrent responsive electromagnetic operating means including a movable armature, a short time delay oscillating escapement mechanism having operating connections with the armature for retarding the tripping movement thereof in a relatively high overcurrent range, means including a separately adjustable spring having one end connected with the short time delay mechanism for varying the lower limit of the said relatively high overcurrent range upon adjustment of the spring, a long time delay dashpot having a piston connected with the other end of the spring to effect yielding thereof during the operation of the short time delay mechanism and to effect operation of the piston to retard the tripping movement of the armature in a relatively low overcurrent tripping range, and means including an independently adjustable spring having a connection with the armature for varying the lower limit of said relatively low overcurrent range upon independent adjustment of the spring.

3. In combination, a circuit breaker movable tripping member, an overcurrent responsive electromagnet having movable magnetic armature means for operating the tripping member and provided with separately adjustable restraining springs for calibrating the tripping response of the armature means to relatively low and relatively high overcurrents, a long time delay dashpot mechanism having a rectilinearly movable piston provided with a relatively movable piston rod having resilient operating connections with the armature means to retard the tripping movement thereof upon response of the armature means to relatively low overcurrents, and a short time delay mechanism having a centrally pivoted oscillating escapement inertia member provided with operating connections with the piston rod to retard the relative movement thereof upon response of the armature means to relatively high overcurrents.

4. In combination, a circuit breaker movable tripping member, an overcurrent responsive electromagnet having a movable armature provided with means for operating the tripping member, means including an adjustable restraining spring for preventing tripping response of the armature when the overcurrent is below a relatively low overcurrent range, a short time delay escapement mechanism having connections with the armature for retarding the tripping movement thereof upon response of the armature in a contiguous higher overcurrent range, a separately adjustable restraining spring having one end connected with the short time delay escapement mechanism for varying the limit between said ranges upon adjustment of the spring, and having a long time delay dashpot mechanism connected with the other end of the spring for retarding the tripping movement of the armature upon response thereof in the relatively low overcurrent range.

5. In combination, a circuit breaker movable tripping member having an overcurrent responsive operating means including a movable armature, a short time delay mechanism having operating connections with the armature for retarding the tripping movement thereof in a relatively high overcurrent tripping range, said connections including a spring for yielding to effect unretarded movement of the armature when the current exceeds the upper limit of the relatively high overcurrent tripping range, means including a separately adjustable spring having one end connected with the short time delay mechanism for varying the lower limit of said relatively high overcurrent range upon adjustment of the spring, and a long time delay mechanism having a connection with the other end of the spring to retard the tripping movement of the armature in a relatively low overcurrent tripping range with a time delay varying inversely with the current value within the limits of the range, and an independently adjustable spring having a connection with the armature for independently varying the lower limit of the relatively low overcurrent tripping range upon independent adjustment of the spring.

6. In combination, a circuit breaker movable tripping member having overcurrent responsive operating means including a movable armature, a short time delay mechanism having an operating connection with the armature means for retarding the tripping movement thereof with a time delay varying inversely with the current value within the limits of the range, said connections including a spring for yielding to render the short time delay mechanism ineffective when the current exceeds the upper limit of the relatively high overcurrent tripping range, means including an adjustable calibrating spring having one end connected with the short time delay mechanism for varying the lower limit of the relatively high overcurrent range and having a longtime delay mechanism connected with the other end of the calibrating spring to retard the tripping movement of the armature in a relatively low overcurrent tripping range with a time delay varying inversely with the variations in current value between the limits of the relatively low overcurrent tripping range, and an independently adjustable spring having a connection with the armature for independently varying the lower limit of said relatively low overcurrent tripping range.

7. Means for controlling the attraction of the hinged armature of a current responsive electromagnet comprising an adjustable spring restraining the armature in the unattracted position until the current exceeds a predetermined value, a long time delay dashpot mechanism having a piston provided with a separately adjustable spring connection with the armature to retard the movement thereof to the attracted position unless the spring connection yields at a predetermined higher current value, a short time delay mechanism having an oscillating escapement member provided with an operating connection with the yielding part of the spring connection to retard the movement of the armature to the attracted position when the spring connection yields, a movable support for both said dashpot mechanism and said escapement mechanism mounted for movement about the hinge axis of the armature, and a calibrating spring for preventing pivotal movement of the support until the electromagnet is energized by current exceeding a predetermined maximum value.

8. In combination, a circuit breaker movable tripping member, an overcurrent responsive electromagnet having a movable armature for operating the tripping member, a short time delay mechanism having an operating member connected with the armature for retarding the tripping movement of the armature in a relatively high overcurrent tripping range, means including a separately adjustable calibrating spring having one end connected with said operating member for varying the lower limit of said relatively high overcurrent range and having a long time delay mechanism connected with the other end of the calibrating spring to operate the long time delay mechanism to retard the tripping movement of the armature in a relatively low overcurrent tripping range, and an independently adjustable calibrating spring having a connection with said operating member for independently varying the lower limit of the relatively low overcurrent tripping range.

9. Means for controlling the attraction of the hinged armature of an overcurrent responsive electromagnet comprising an adjustable calibrating spring for restraining the armature in the unattracted position until the electromagnet is energized by current above a predetermined value, a long time delay dashpot mechanism having a piston provided with operating connections with the armature to retard the attraction thereof, said connections including a spring adjustable for yielding when the electromagnet is energized by a current above a predetermined higher value, and a short time delay mechanism having an oscillating escapement member operatively connected with the yielding part of the connection spring to retard the attraction of the armature upon yielding of said spring, and means including a sealed casing pivoted coaxially with the hinge axis of the armature for movably mounting both said long time delay mechanism and said short time delay mechanism therein for joint pivotal movement with the armature when the electromagnet is energized by a predetermined maximum current.

GERALD H. SYROVY.
JOSEPH W. SEAMAN.

REFERENCES CITED

The following references are of record in the file of this patent:

UNITED STATES PATENTS

| Number | Name | Date |
|---|---|---|
| 1,123,288 | Hellmund | Jan. 5, 1915 |
| 1,216,570 | Hohn | Feb. 20, 1917 |
| 1,250,746 | Wolff | Dec. 18, 1917 |

(Other references on following page)

UNITED STATES PATENTS

| Number | Name | Date |
|---|---|---|
| 1,330,094 | Simon | Feb. 10, 1920 |
| 1,622,044 | Miller | Mar. 27, 1927 |
| 1,702,204 | Dudley | Feb. 12, 1929 |
| 1,738,461 | Stevens | Dec. 3, 1929 |
| 1,764,382 | Ashbaugh | June 17, 1930 |
| 2,060,492 | Dyer | Nov. 10, 1936 |
| 2,340,973 | May et al. | Feb. 8, 1944 |
| 2,393,726 | Bennett et al. | Jan. 29, 1946 |
| 2,419,892 | Graves, Jr. | Apr. 29, 1947 |
| 2,439,165 | Graves, Jr. | Apr. 6, 1948 |
| 2,486,594 | Graves, Jr. | Nov. 1, 1949 |
| 2,486,595 | Graves, Jr. | Nov. 1, 1949 |
| 2,503,154 | Graves, Jr. | Apr. 4, 1950 |